US008506662B2

(12) United States Patent
Mäkinen

(10) Patent No.: US 8,506,662 B2
(45) Date of Patent: Aug. 13, 2013

(54) PROACTIVE STEAM AND MIST REMOVAL SYSTEM

(75) Inventor: Tuomo Tapio Mäkinen, Nokia (FI)

(73) Assignee: Honeywell International Inc., Morristown, NJ (US)

( * ) Notice: Subject to any disclaimer, the term of this patent is extended or adjusted under 35 U.S.C. 154(b) by 384 days.

(21) Appl. No.: 12/763,637

(22) Filed: Apr. 20, 2010

(65) Prior Publication Data

US 2011/0252968 A1 Oct. 20, 2011

(51) Int. Cl.
*B01D 45/08* (2006.01)
(52) U.S. Cl.
USPC .................. 55/338; 55/423; 55/434.4; 55/443
(58) Field of Classification Search
USPC ............. 55/442, 456, 315, 338, 338.1, 385.1, 55/419, 434, 437
See application file for complete search history.

(56) References Cited

U.S. PATENT DOCUMENTS

| | | | | |
|---|---|---|---|---|
| 1,705,516 A | * | 3/1929 | Farnsworth | 34/552 |
| 4,096,643 A | * | 6/1978 | Futcher | 34/122 |
| 4,247,991 A | * | 2/1981 | Mehta | 34/472 |
| 4,314,668 A | * | 2/1982 | Jansen et al. | 237/2 B |
| 4,358,900 A | * | 11/1982 | Dove | 34/568 |
| 4,543,737 A | | 10/1985 | Boissevain | |
| 4,603,489 A | * | 8/1986 | Goldberg | 34/77 |
| 4,780,967 A | * | 11/1988 | Mucic | 34/86 |
| 5,020,245 A | | 6/1991 | Langevin | |
| 5,798,026 A | | 8/1998 | Wacinski | |
| 6,056,856 A | | 5/2000 | Graf | |
| 6,334,579 B1 | | 1/2002 | Zarbi | |
| 7,459,061 B2 | | 12/2008 | Passiniemi | |
| 7,513,975 B2 | | 4/2009 | Burma | |
| 7,665,225 B2 | | 2/2010 | Goldberg | |
| 2001/0008180 A1 | | 7/2001 | Anderson | |
| 2007/0209769 A1 | | 9/2007 | Nogami | |

OTHER PUBLICATIONS

PCT/US2011/031515 Search Report and Written Opinion Jan. 2, 2012.

* cited by examiner

*Primary Examiner* — Duane Smith
*Assistant Examiner* — Sonji Turner
(74) *Attorney, Agent, or Firm* — Cascio Schmoyer & Zervas

(57) ABSTRACT

A proactive steam and mist removal apparatus is employed along a point of application of a rewet or steam shower system to remove excess steam and water droplets to prevent damage to machinery and products. The apparatus includes an internal chamber equipped with cooled baffles that promote condensation and a condensate collection mechanism. A vacuum source draws a stream of ambient steam and water droplets from the environment along a path into the chamber and a projected gas stream directs the stream into the chamber wherein at least a portion of the ambient steam condenses into condensate. The remaining portion of ambient steam is separated into water and cold air that is recycled as the projected gas. Steam and moisture that escape capture into the internal chamber are heated by a hot air blower that raises their relatively humidity so that the dried air dissipates harmlessly into the atmosphere.

20 Claims, 3 Drawing Sheets

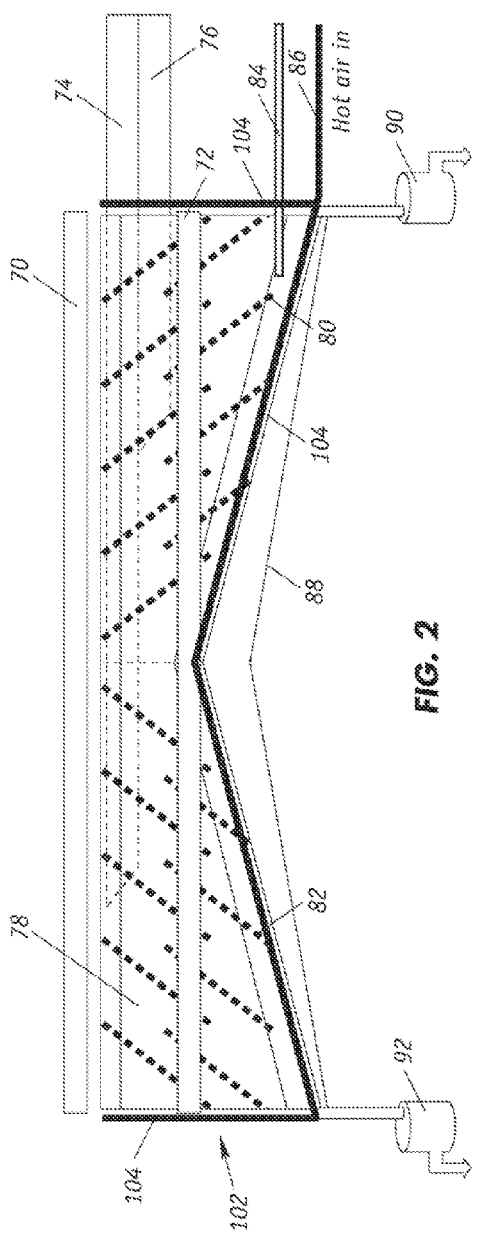
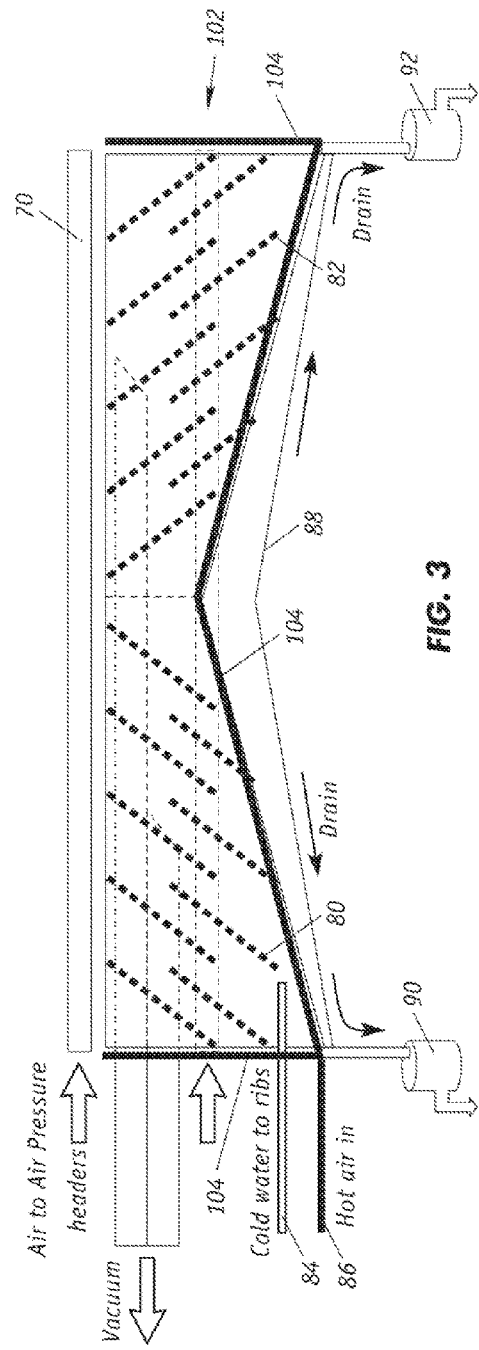

PROACTIVE STEAM AND MIST REMOVAL SYSTEM

FIELD OF THE INVENTION

The present invention generally relates to techniques for removing excess steam and moisture and particularly to devices for removing water vapor and mist that are generated by steaming and rewet systems employed in papermaking machines.

BACKGROUND OF THE INVENTION

In the manufacture of paper on continuous papermaking machines, a web of paper is formed from an aqueous suspension of fibers (stock) on a traveling mesh papermaking fabric as water drains by gravity and suction through the fabric. The web is then transferred to the pressing section where more water is removed by pressure and vacuum. The web next enters the dryer section where steam heated dryers and hot air completes the drying process. The papermaking machine is, in essence, a water removal, system.

Conventional papermaking machinery includes equipment to set the sheet properties of the paper as it is being manufactured. One of the more basic operations on a papermaking machine is control of the cross-direction (CD) moisture profile by rewetting or remoisturizing with water sprays administered by spray nozzles. By applying water to the drier areas of a sheet, a uniform CD moisture profile can be created. This is usually carried out to ensure that the moisture profile at the reel is uniform. Similarly, steam heating of a paper sheet is widely practiced in papermaking. The increase in sheet temperature that results provide increased drainage rates for the water thus reducing the amount of water to be evaporated in the dryer section. Water drainage is improved by the application of steam principally because the heating of the sheet reduces the viscosity of the water, thus increasing the ability of the water to flow. Most of the heat transfer takes place when the steam condenses in the sheet. The condensation of the steam transforms the latent heat of the steam to sensible heat in the water contained by the sheet. As in the case of rewetting, in steam heating the amount of steam applied may be varied across the width of the sheet along the cross machine direction so that the CD moisture profile of the sheet may be modified.

Unfortunately, in both rewet and steam shower processes, water tends to accumulate in the vicinity adjacent the points of application. Large water droplets develop on surrounding structures that can result in the formation of rust and related problems. In addition, the rotating rolls and airflow of the machinery can propel droplets onto the paper sheet. Conventional vacuum boxes, which are not energy efficient, demonstrate only limited success in removing the excess steam and moisture; as a result, the excess water is detrimental to the production of high quality paper and the operations of the machinery.

SUMMARY OF THE INVENTION

The present invention is based in part on the development of a proactive steam and mist removal apparatus that can be employed in any environment where excess steam and water droplets are generated. The apparatus is particularly suited for use in an enclosed manufacturing environment where the steam and water droplets if not removed would cause damage to the machinery and products being made.

In one aspect, the invention is directed to an apparatus for removing ambient steam and water droplets from the environment that includes:
 a. a housing defining a chamber comprising contact surfaces that promote condensation;
 b. a vacuum source that draws ambient steam and water droplets from the environment along a path into the chamber; and
 c. a source of gas that projects a stream of gas along the path of ambient steam and water droplets to direct the ambient steam and water droplets into the chamber wherein at least a portion of the ambient steam condenses into condensate and wherein the remaining portion of the ambient steam is directed into a separation means for separating the remaining portion of ambient steam into a liquid component comprising water and a gaseous component.

The inventive apparatus is particularly suited for used in a papermaking machine to capture excess steam and water droplets in the form of misty air that is generated in rewet and steam shower applications. In a preferred embodiment, the configuration of the housing facing the misty air takes advantage of the natural motion of the cloud of misty air that develops by defining an entry point into the chamber that initially accelerates the velocity of the misty air. Moreover, the internal structures within the chamber near the entry point are preferably designed with an abrupt turn away from the direction of flow so that centrifugal forces facilitate the separation of free droplets from the steam of the misty air. The free droplets are readily collected and drained away from the papermaking machine.

In another aspect, the invention is directed to a method of removing ambient steam and water droplets that includes the steps of:
 a. providing a housing defining a chamber comprising contact surfaces that promote condensation;
 b. drawing the ambient steam and water droplets from the environment along a path into the chamber;
 c. projecting a stream of gas along the path of ambient steam and water droplets to direct the ambient steam and water droplets into the chamber wherein at least a portion of the ambient steam condenses into condensate and wherein the remaining portion of the ambient steam is separated into a liquid component comprising water and a gaseous component.

In a further aspect, the invention is directed to an improved papermaking machine equipped with a mist removal system that includes:
 a source of mist that is generated at an application point along the machine direction of the papermaking machine; and
 a vacuum-assisted device positioned adjacent the application point that includes:
  i. a housing defining a chamber comprising contact surfaces that promote condensation;
  ii a vacuum source that draws ambient steam and water droplets from the environment along a path into the chamber; and
  iii. a source of gas that projects a stream of gas along the path of ambient steam and water droplets to direct the ambient steam and water droplets into the chamber wherein at least a portion of the ambient steam condenses into condensate and wherein the remaining portion of the ambient steam is directed into a separation means for separating the remaining portion of ambient steam into a liquid component comprising water and a gaseous component.

BRIEF DESCRIPTION OF THE DRAWINGS

FIGS. 2 and 3 are front and rear views, respectively, of a steam and mist removal apparatus.

DETAILED DESCRIPTION OF PREFERRED EMBODIMENTS

The steam and mist removal device of the present invention can be employed in any environment such as an industrial setting where excess steam and/or mist are continuously generated. The device is particularly suited for employment in an enclosed area where steam and water droplets do not readily dissipate into the atmosphere.

Figure 1:
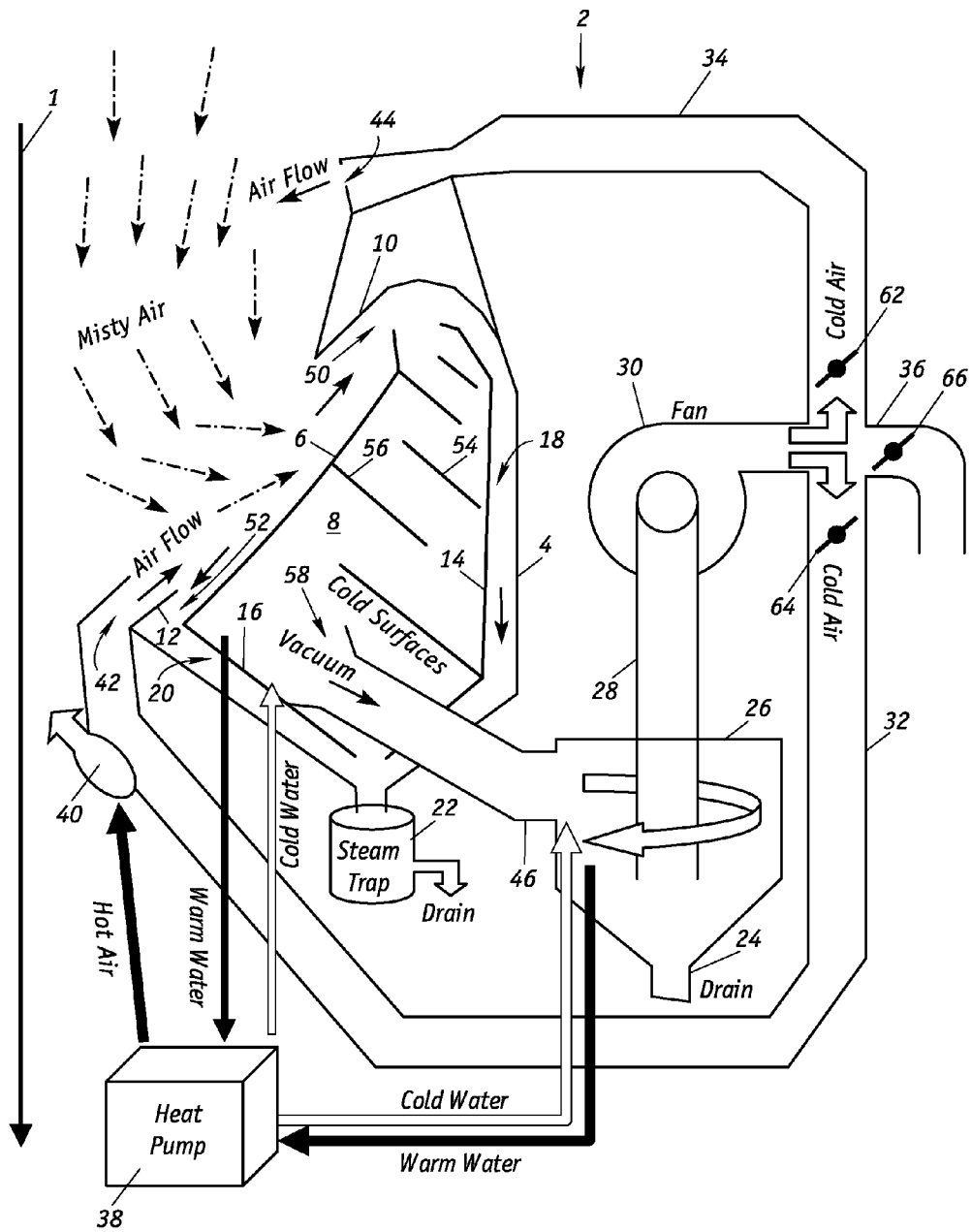
FIG. 1 is a cross sectional schematic view of a steam and mist removal apparatus.

As illustrated in FIG. 1, the steam and mist removal device 2 includes a housing 4 that defines a chamber 8 with an opening that is partially shielded by front panel 6. Upper flange 10 of housing 4 and the upper end of panel 6 define an upper entrance 50 into chamber 8. Lower flange 12 of housing 4 and the lower end of panel 6 define a lower entrance 52. A rear inner panel 14 having a surface that preferably matches that of housing 4 forms a rear channel 18 where condensate collects. Similarly, a lower front inner panel 16 having a surface that preferably matches that of housing 4 forms a front channel 20 where condensate collects. Channels 18, 20 collect condensate and free water droplets into a steam trap 22, which has a drain through which water is disposed. Located at the lower end of housing 4 is a vacuum duct 46 through which a suction force is applied into chamber 8. A plurality of baffles 54, 56 is situated within chamber 8 between upper entrance 50 and vacuum duct entrance 58.

Vacuum duct 46 is connected to the inlet of a gas-liquid separator 26, which for instance can comprise a condensing cyclone separator having a drain 24 at the lower conical section and an upper gas outlet tube 28 that is connected to a fan blower 30. Air from fan blower 30 is diverted into an upper air header 34 and a lower air header 32. Valves 62 and 64 controls the flow rates into upper and lower air headers 34 and 32, respectively. Relief valve 66 diverts excess airflow through channel 36 and into the atmosphere. Preferably about 20% by volume of the air from fan blow 30 is diverted into upper air header 34 and projected out of upper air discharge outlet 44 while preferably about 20% by volume of the air from fan blow 30 is diverted into lower air header 32 and projected out of lower air discharge outlet 42. The remaining 60% of the air flows into the atmosphere through channel 36. Under these operating conditions, it is expected that (i) approximately 95% by volume of the misty air that enters the steam and mist removal device 2 will flow into chamber 8 and into contact with baffles 54, 56 (with a portion thereof eventually circulating into channel 18) and (ii) the remaining approximately 5% of the misty air will enter into channel 20.

To facilitate condensation, selected surfaces of housing 4 and baffles 54, 56 as well as condensing cyclone 26 are preferably cooled by heat pump 38 which deliveries cold water to cooling coils (not shown) that are in thermal contact with surfaces on these structures. A heat pump 38 can be employed whereby warm water is recycled from each of these units. Heat pumps are described for example in U.S. Pat. No. 7,665,225 to Goldberg et al., which is incorporated herein by reference. Finally, one or more hot air apparatuses 40, such as a hot air blower that is supplied by heat pump 38, can be employed to dry escaping steam or mist that is not drawn into the vacuum of steam and mist removal device 2.

As depicted in FIG. 1, device 2 is strategically positioned adjacent moving web of paper 1 and to a source of the steam and mist so that excess steam and mist, which consists of free water droplets, which are collectively labeled as "misty air," can be efficiently removed. A continuously moving cloud of misty air is generated adjacent paper 1 and flows naturally toward the entry point of device 2 that faces the incoming cloud. The vacuum-generating device 2 is energy efficient as it is configured and positioned to along the natural path of the misty air. In operation, a vacuum in chamber 8 is established when fan 30 is activated. The misty air flows toward the direction of lowest pressure that, in this embodiment, is into upper entrance 50 and lower entrance 52. Upper entrance 50 defines a narrow gap where the velocity of the misty increases. As the fast moving misty air suddenly turns toward rear channel 18, the centrifugal force drives the heavier free water droplets against the inner surface of flange 10. The free water droplets are collected by and drained down through rear channel 18. Furthermore, as the misty air then is pulled through chamber 8, some of the water vapor comes into contact with cooled baffles 54, 56 and condense into water. Condensate along with water droplets in the misty air are collected by gravity at the bottom of chamber 8 where airflow induced by the vacuum force is at the lowest level in order to minimize the impact of air to flow of condensate. Chamber 8 is preferably configured with a relatively narrow top portion and an expansive bottom portion that causes the velocity of the air to be lower at the bottom. The result is that gravity drains the water away faster with minimum obstruction and less misty air is blown toward vacuum entrance 58. Steam trap 22 is preferably configured to operate by gravitational pull so as to avoid air leakage through chamber 8, rear channel 18 and front channel 20.

Misty air, which is not condensed within chamber 8, along with entrained water droplets are drawn through vacuum duct 46 whose entrance 58 within chamber 8 is preferably located above steam trap 22. Within condensing cyclone 26, a high-speed airflow is established within the upper cylindrical and lower conical interior by centrifugal force. Air flows in a spiral pattern, beginning at the top (wide end) of condensing cyclone 26 and ending at the bottom (narrow) end before exiting the cyclone in a straight stream through the center of the cyclone and out the top. Larger (denser) water droplets in the rotating stream collide with the conical wall and fall to bottom of cyclone 26 and are removed via drain 24.

The substantially water-free air from condensing cyclone 26 is directed into lower air header or duct 32 and upper air header or duct 34 where it is projected through upper air discharge outlet 44 and lower air discharge outlet 42, respectively. Most of the misty air along with residual free water droplets is recycled through valves 60, 62, which controls the relative volumes of air flowing into each duct.

Upper air discharge outlet 44 is configured so that high velocity airflow is projected preferably perpendicular to the path of the approaching high humidity misty air. The force of the projected jet of air redirects the misty air towards front panel 6 whereupon high velocity airflow projected from lower air discharge outlet 42 pushes most of the air along with the air from outlets 42 and 44 into upper entrance 50. Misty air that is not captured into steam and mist removal device 2 is heated by hot air from hot air apparatus 40. The temperature of the hot air is sufficient to change the relative humidity of the misty air to cause it to dry out and dissipate harmlessly into the atmosphere.

FIGS. 2 and 3 illustrate the front and rear views, respectively, of a steam and mist removal device 102 that is particularly suited for capturing misty air that emanates from a source that generates a layer of misty air expanding over an extended length. As shown, this embodiment includes an upper discharge outlet 70 and a lower discharge outlet 72, with each outlet comprising an elongated structure through which a jet of high velocity air is projected onto approaching misty air. A front panel 78 shields the internal chamber that houses baffles or condensing ribs 80, 82. Given the length of the internal chamber, two vacuum ducts 74, 76 are employed in order to maintain a more uniform vacuum within the chamber. The longer vacuum duct 74 extends farther into the internal chamber. The lower surface 88 of the internal chamber has a pyramid-like contour with an apex at the center and smooth sloping surfaces on each side of the apex as viewed along the length of the steam and mist removal device 102. This configuration facilitates drainage of water into steam traps 90, 92. The external periphery of the steam and mist removal device 102 is equipped with a pipe or header 104 with holes (not shown) through which hot air is projected into contact with the escaping steam and mist.

In operation, a vacuum is generated within the internal chamber as steam and mist are drawn through vacuum ducts 74, 76 and into a condensing cyclone 26 (FIG. 1). Recycled cold air from a condensing cyclone 26 is projected through upper and lower air discharge outlets 70, 72 into the misty air. A source of cold water 84 delivers cold water to baffles 80, 82 and condensing cyclone 26 (FIG. 1) to facilitate condensation. A source of hot air 86 is connected to header 104 to dry escaping mist and steam along the periphery of steam and mist removal device 102.

Figure 4:
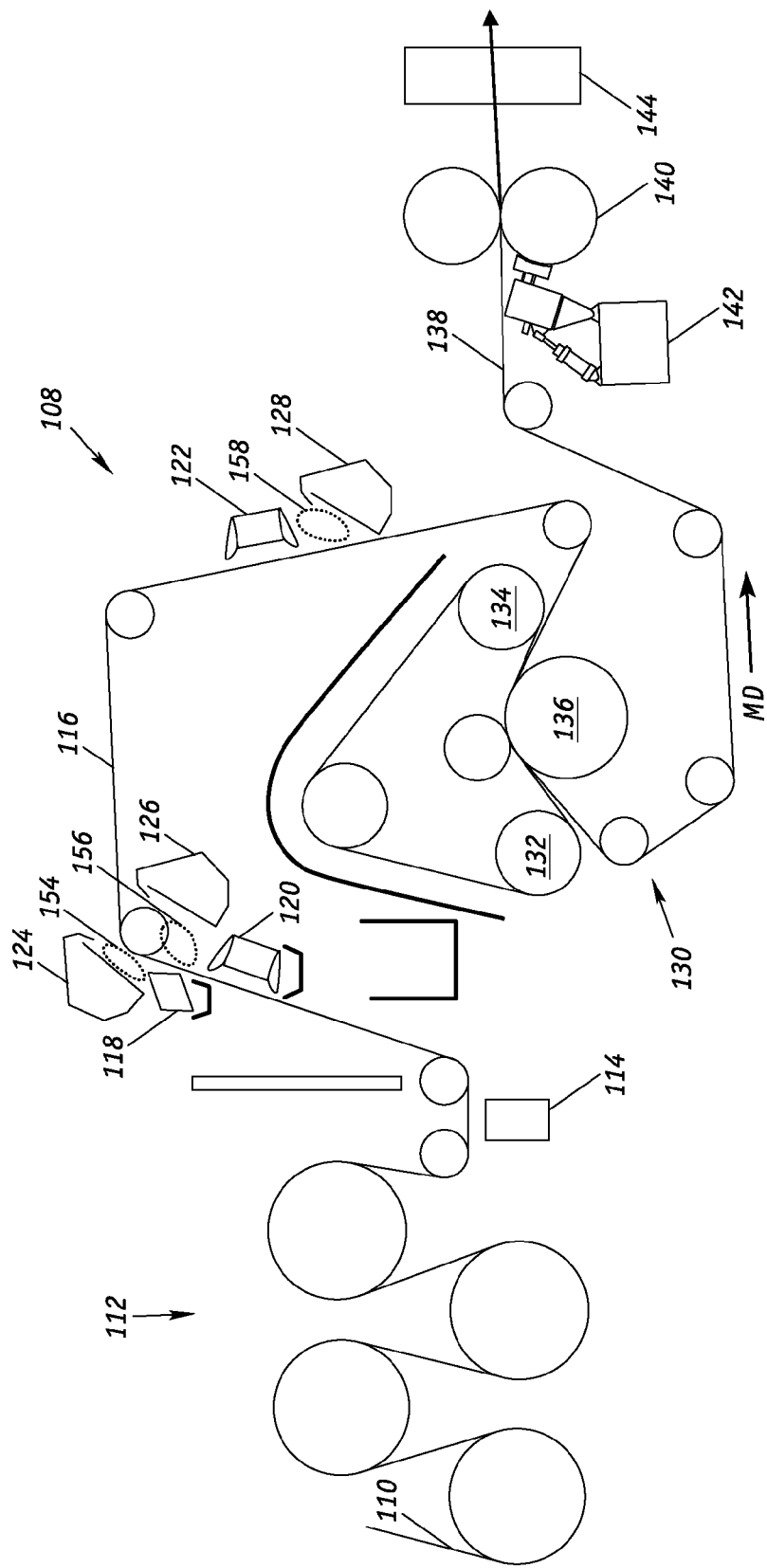
FIG. 4 depicts an example of a papermaking machine employing steam and mist removal apparatuses.

FIG. 4 illustrates use of the steam and mist removal device 102 (FIGS. 2 and 3) at strategic stages in a papermaking machine 108. In particular, an inventive device can be positioned adjacent any source of steam and mist at a point of application along the machine direction (MD) of the papermaking machine. As shown in FIG. 4, a web or sheet of paper 110 from a forming section and press section (not shown) of papermaking machine 108 is conveyed through a series of drying cylinders 112 where additional water is removed and the web or sheet structure consolidated. A gauge/controller assembly 114 measures one or more properties such as the moisture level of web of paper 110 along its cross direction. In this example, papermaking machine 108 is equipped with three rewet systems for web surface re-moisturizing in order to improve surface properties and simultaneously apply cross directional moisture control to sheet of paper 116.

The first rewet (or remoisturizing) system includes a rewet spray device 118 with an associated steam and mist removal device 124 that are both positioned on the topside of sheet 116. The second rewet system includes a rewet spray device 120 with an associated steam and mist removal device 126 that both are positioned on the bottom side of sheet 116. Finally, farther downstream is a third rewet system includes a rewet spray device 122 with an associated steam and mist removal device 128 that are both positioned on the topside of sheet 116. In each rewet system, water is sprayed onto sheet 116 and the associated steam and mist removal device is positioned so that the suspension of misty air that is generated is on the front side of the device. Rewet systems and associated actuators and controls are described for example in U.S. Pat. Nos. 6,334,579 to Zarbi and 7,513,975 to Burma, which are incorporated herein by reference. Instead of rewet systems, steam shower distribution systems can be employed with the inventive steam and mist removal device. Steam application devices are described for example in U.S. Pat. No. 4,543,737 to Boissevain, U.S. Pat. No. 5,798,026 to Wacinski et al., and U.S. Pat. No. 7,459,061 to Passiniemi, which are incorporated herein by reference.

Each remoisturizing spray device provides a fine water spray to selected areas on sheet 116 along the cross direction for CD moisture profile control. The spray devices can be controlled by signals from gauge/controller assembly 114 and/or scanner 144. They provide on-line measurements of sheet properties, such as thickness, moisture, gloss or smoothness that are made by scanning sensors that travel back and forth across the width of the sheet of paper in the cross-machine direction. The scanning sensors collect information about the sheet properties to develop a property profile across the sheet and provide control signals to the appropriate actuators to adjust the profile toward a desired target profile in a feedback loop. As water is sprayed onto the surface of sheet 116, clouds of misty air 154, 156 and 158, each comprising an aggregation of minute globules of water suspended in the atmosphere, are continuously generated. Steam and mist removal devices 124, 126 and 128 are positioned to effectively remove the misty air in order to prevent water droplets from being indiscriminately deposited onto sheet 116 and water damage to the machinery.

Following the re-moisturizing process, the paper contacts a series of oil-heated rolls 132, 134, 136 and a finishing metal belt in the finishing section 130 where improved surface characteristics are imparted on the paper sheet. Sheet 138 is calendered through a pair of rolls 140 to allow for thickness control and to further smooth the surface. A heating device 142 selectively heats a calender roll surface to control the sheet caliper in the cross direction. Scanner 144 measures moisture content and/or other properties of the dried, calendered sheet before it is accumulated by winding onto a reel (not shown).

The foregoing has described the principles, preferred embodiments and modes of operation of the present invention. However, the invention should not be construed as being limited to the particular embodiments discussed. Thus, the above-described embodiments should be regarded as illustrative rather than restrictive, and it should be appreciated that variations may be made in those embodiments by workers skilled in the art without departing from the scope of the present invention as defined by the following claims.

What is claimed is:

1. An apparatus for removing ambient steam and water droplets from the environment that comprises:
   a. a housing defining a chamber comprising contact surfaces that promote condensation;
   b. a vacuum source that draws ambient steam and water droplets from the environment along a path into the chamber;
   c. a source of as that projects a stream of gas along the path of ambient steam and water droplets to direct the ambient steam and water droplets into the chamber wherein at least a portion of the ambient steam condenses into condensate and wherein the remaining portion of the ambient steam is directed into a separation means for separating the remaining portion of ambient steam into a liquid component comprising water and a gaseous component; and
   d. at least one header thorough which the gaseous component is recycled to form at least a portion of the stream of gas that is projected from the source of gas along the path of ambient steam and water droplets.

2. The apparatus of claim 1 wherein the gaseous component contains water droplets.

3. The apparatus of claim 1 wherein the chamber includes an entrance through which the ambient steam and water droplets enter the chamber and the chamber includes a plurality of baffles that define at least one channel from the entrance to the separation means.

4. The apparatus of claim 1 comprising means to cool the contact surfaces with cold fluid.

5. The apparatus of claim 1 wherein the separation means comprises a cyclone unit.

6. The apparatus of claim 1 wherein the housing defines at least one condensate channel through which condensate that develops in the housing flows and is collected.

7. The apparatus of claim 1 comprising a heat pump that cools the separation means and the contact surfaces.

8. The apparatus of claim 1 wherein the chamber includes an entrance through which the ambient steam and water droplets enter the chamber and the apparatus comprising means for supplying a jet of heated gas in a direction that is away from the entrance and along a periphery of the ambient steam and water droplets to vaporize water droplets that are not drawn into the entrance into vapor.

9. The apparatus of claim 1 wherein the source of gas projects a first stream of gas that is substantially water-free along the path of ambient steam and water droplets and a second stream of was that is substantially water-free along the path of ambient steam and water droplets to direct the ambient steam and water droplets into the chamber.

10. The apparatus of claim 9 wherein the housing has an elongated configuration having an extended upper surface and an extended lower surface and wherein the first stream of gas is projected along the extended upper surface and the second stream of gas is projected along the extended lower surface.

11. The apparatus of claim 1 wherein the stream of gas consists entirely of recycled gas that is derived from the gas component.

12. The apparatus of claim 1 wherein the chamber has an entrance, a first side and a second side that is opposite the first side, wherein the apparatus comprises a first header with a first outlet that is adjacent the first side and a second header with a second outlet that is adjacent the second side, and a portion of the gaseous component is recycled thorough the first and second headers and out the first and second outlets to project first and second streams of gas along the path of ambient steam and water droplets.

13. The apparatus of claim 12 wherein the first and second streams of gas consist entirely of recycled gas that is derived from the gas component.

14. The apparatus of claim 12 wherein the source of gas is substantially water-free.

15. The apparatus of claim 1 wherein the source of gas is substantially water-free.

16. The apparatus of claim 4 wherein the cold fluid comprises water.

17. An apparatus for removing ambient steam and water droplets from the environment that comprises:
   a. a housing defining a chamber comprising contact surfaces that promote condensation;
   b. a vacuum source that draws ambient steam and water droplets from the environment along a path into the chamber;
   c. a source of gas that projects a stream of gas along the path of ambient steam and water droplets to direct the ambient steam and water droplets into the chamber wherein at least a portion of the ambient steam condenses into condensate and wherein the remaining portion of the ambient steam is directed into a separation means for separating the remaining portion of ambient steam into a liquid component comprising water and a gaseous component;
   d. means for cooling the contact surfaces including a source of fluid that delivers cold fluid to the contact surfaces; and
   e. at least one header thorough which the gaseous component is recycled to form the stream of gas that is projected front the source of gas along the path of ambient steam and water droplets wherein the stream of gas consists entirely of recycled gas that is derived from the gas component.

18. The apparatus of claim 17 wherein the chamber includes an entrance through which the ambient steam and water droplets enter the chamber and the apparatus comprising means for supplying a jet of heated gas in a direction that is away from the entrance and along a periphery of the ambient steam and water droplets to vaporize water droplets that are not drawn into the entrance into vapor.

19. The apparatus of claim 17 wherein the chamber has an entrance, a first side and a second side that is opposite the first side, wherein the apparatus comprises a first header with a first outlet that is adjacent the first side and a second header with a second outlet that is adjacent the second side, and a portion of the gaseous component is recycled thorough the first and second headers and out the first and second outlets to project first and second streams of gas along the path of ambient steam and water droplets.

20. The apparatus of claim 17 wherein the source of gas is substantially water-free.

* * * * *